United States Patent [19]

Sekiguchi

[11] 4,212,439

[45] Jul. 15, 1980

[54] MAGNETIC TAPE RECORDING AND/OR REPRODUCING APPARATUS

[75] Inventor: Fumio Sekiguchi, Sagamihara, Japan

[73] Assignee: Sony Corporation, Tokyo, Japan

[21] Appl. No.: 954,194

[22] Filed: Oct. 24, 1978

[30] Foreign Application Priority Data

Nov. 1, 1977 [JP] Japan ................... 52-131034

[51] Int. Cl.² .................... G03B 1/04; G11B 15/32
[52] U.S. Cl. ..................................... 242/206
[58] Field of Search ................. 242/206–210; 352/159; 360/85, 88, 95; 226/113

[56] References Cited

U.S. PATENT DOCUMENTS

| 3,747,872 | 7/1973 | Johnson et al. | 242/206 |
|---|---|---|---|
| 3,845,501 | 10/1974 | Katsuta et al. | 360/85 |
| 3,864,742 | 2/1975 | Katoh | 360/85 |
| 4,075,670 | 2/1978 | Namoto et al. | 360/85 |
| 4,092,686 | 5/1978 | Schulz | 360/95 |

Primary Examiner—Leonard D. Christian
Attorney, Agent, or Firm—Lewis H. Eslinger; Alvin Sinderbrand

[57] ABSTRACT

Magnetic tape recording and/or reproducing apparatus includes a device for providing a predetermined increase in the length of a loop of tape which extends between the point of contact between a capstan and a pinch roller and the opposite side of the pinch roller. The tape amount increasing device broadly comprises a linkage having first and second positions and to which first and second rollers are mounted at opposite ends thereof. The linkage is further pivoted at one end whereby a loop of tape passes around the first roller mounted at the pivoted end of the linkage in the first position of the linkage, and around the second roller when the linkage is in its second position.

13 Claims, 5 Drawing Figures

MAGNETIC TAPE RECORDING AND/OR REPRODUCING APPARATUS

BACKGROUND OF THE INVENTION

1. Field of the Invention

This invention relates to a magnetic tape recording and/or reproducing apparatus, and more specifically, to a magnetic tape recording and/or reproducing apparatus having a capstan against which a pinch roller presses for feeding a magnetic tape at a constant speed from a supply reel past a recording and reproducing head, and wherein a predetermined small amount of the magnetic tape is returned past the head toward the supply reel when the tape is stopped.

2. Description of the Prior Art

Generally, it is preferable that a magnetic tape recorder which is stopped while recording be able to begin recording anew precisely at the end of the previously recorded material without erasing any of the previously recorded material. To accomplish this, a mechanism for returning a small amount of tape toward the supply reel at the interruption of a recording operation is generally provided in the magnetic recorder. This mechanism pulls back a small amount of tape from the recording or reproducing section, for example, from around the tape guide drum in a helical scan VTR, when the recorder is stopped.

A given tape amount returning method is conventionally used as a simple method for drawing a given amount of a magnetic tape, suitably 3 to 60 mm back from the head. According to this method, two or more posts that guide the magnetic tape are spring loaded and moveable. When the tape motion is stopped, tension of tape on the supply side of a guide drum is reduced while the tension on the take-up side is increased. The spring loaded guide post on the supply side therefore is permitted to move the tape against the reduced tension in that location to form a tape loop while the spring loaded guide post on the take-up side is forced by the increased tension to give up a tape loop it previously held. Thus, when the tape is stopped, the transfer of the tape from one tape loop to the other shifts the tape past the head toward the supply side.

The prior art is further described with reference to FIG. 1 which shows a conventional arrangement of the prior art wherein the given amount returning method is applied to a helical scanning type VTR. In the recording or play-back mode, a magnetic tape 2 from a supply reel 1 is guided by stationary posts 3 and 5 and moving post 4, then wound around a guide drum 6 which contains the recording and/or reproducing heads, and is held against a capstan 7 by means of a pinch roller 8 so as to be fed at a constant speed. The tape is further guided by stationary posts 9, 10, 11, 12, 13 and 15 and moving post 14, and is accumulated an a take-up reel 16. During recording or play-back, reel brakes 17 and 18 remain disengaged from reel hubs 19 and 20 as shown in FIG. 1. The moving post 4 is fixed to one end of an arm 21 which is pivotally mounted at the other end, and is urged by a spring 22 in the clockwise direction. When the magnetic tape 2 is being fed at a constant speed, the moving post 4 is in position A in balance between the tension of the tape and the force of the spring 22. In position A, moving post 4 forms virtually no tape loop.

Recording or reproduction is stopped by simultaneously applying the brakes 17 and 18 to the supply and to take up reel hubs 19 and 20 and disengaging the pinch roller 8 from the capstan 7. The moving post 14 moves from position B to position C so as to eliminate the loop of tape 2 in response to the increased tension in this part of the stopped tape. Moving post 4, being pulled by the spring 22, moves from position A to position D thus increasing the length of the loop in response to the reduced tension in that location. A given amount of the magnetic tape around the guide drum 6 which contains magnetic recording and reproducing heads is returned counterclockwise about the guide drum from the tape loop about moving post 14 toward the supply reel 1 and is taken up in the enlarged loop formed by stationary posts 3 and 5 and moving post 4.

According to this method, the angles of embrace of the magnetic tape 2 on the moving posts 4 and 14 are large, and the resulting large frictional load frequently prevents completely returning a given amount of the tape from the moving post 14 to the moving post 4. Since the tape tension decreases as the tape approaches the moving post 14, and since the balance between tape rigidity and tension determines the angle of embrace of the tape wound on moving posts 4 and 14, any environment-dependent change in the friction coefficient between the tape and stationary and moving posts causes a change in the tape tension which then results in a varying amount of the tape being returned to moving post 4.

A further cause of variability of tape returned by this method derives from the use of the brakes 17 and 18 for stopping the magnetic tape when the pinch roller 8 is disengaged from the capstan 7. Reel inertia and speed change as a reel becomes filled or emptied of tape. This change causes a change in the stopping positions of the two reels 1 and 16 as the tape is transferred from supply reel 1 to take-up reel 16. This results in substantial change of the amount of tape returned to moving post 4 upon disengagement of the pinch roller 8 from the capstan 7.

OBJECTS AND SUMMARY OF THE INVENTION

It is an object of the present invention to provide a tape return apparatus for a magnetic tape recording and/or reproducing apparatus which overcomes the disadvantages of the prior art.

More specifically it is an object of the present invention to provide a tape return apparatus which returns a precise amount of magnetic tape upon stopping a magnetic tape recording and/or reproducing apparatus.

It is a further object of the present invention to provide a magnetic tape return apparatus in which the amount of tape returned upon stopping a magnetic tape recording and/or reproducing apparatus is substantially independent of changes in friction coefficient due to environmental changes.

It is yet a further object of the invention to provide a magnetic tape return apparatus which overcomes the variability in tape returned due to varying inertia and speed of tape supply and take-up reels.

According to one aspect of the invention, there is provided a magnetic tape recording and reproducing apparatus having magnetic tape supply and take-up reel means with a magnetic head assembly disposed along the magnetic tape path between the two reel means. A capstan and pinch roller are provided for driving the magnetic tape therebetween at a constant speed, and the pinch roller has a first position against the capstan and a second position away from the capstan. A device is provided to effect a predetermined increase in the length of tape extending from the capstan toward the supply reel means. Such device includes a braking member for pinching the tape between the braking member and the pinch roller when the pinch roller is in its second position, thereby preventing movement of the tape, and a second or loop-forming member for forming a tape loop extending from the pinch roller. The loop-forming member has means for defining a large loop when the pinch roller is in its first position and a small loop when the pinch roller is in its second position.

According to a preferred embodiment of the invention, the loop-forming member has a roller and a post, with the roller being moveable in an arc about the post in synchronism with the movement of the pinch roller to its first and second positions. The roller is moved to a position at the side of the post remote from the pinch roller when the pinch roller is in its first position whereby a large loop is formed and is moved to a position at the side of the post nearer the pinch roller when the pinch roller is in its second position whereby a small loop is formed. A second loop-forming means is preferably provided between the recording/reproducing head and the supply reel so as to take up the tape released by the shortening of the first mentioned loop. The release of tape from a shortened loop on one side of the recording/reproducing head and the taking up of the released tape on the supply side of the head thus returns a fixed amount of tape toward the supply side each time the tape is stopped by moving the pinch roller from its first to its second position.

Increased precision in the amount of tape returned in the preferred embodiment is achieved by synchronizing the movement of the roller of the loop-forming means to occur following the completion of the movement of the pinch roller. Thus, in the most preferred embodiment, the roller of the loop-forming means moves in the direction to reduce the size of the loop only after the fixed braking post has contacted the pinch roller to bring the tape to a stop. Also, the roller of the loop forming means moves in the direction to increase the size of the loop only after the pinch roller has moved into contact with the capstan.

Reel brakes are preferably provided to stop the supply reel and the take-up reel in synchronism with the movement of the pinch roller to its second position.

The above, and other objects, features and advantages of the invention, will be noted in the following detailed description of the invention with reference to the drawings.

DETAILED DESCRIPTION OF THE PREFERRED EMBODIMENT

Figure 1:
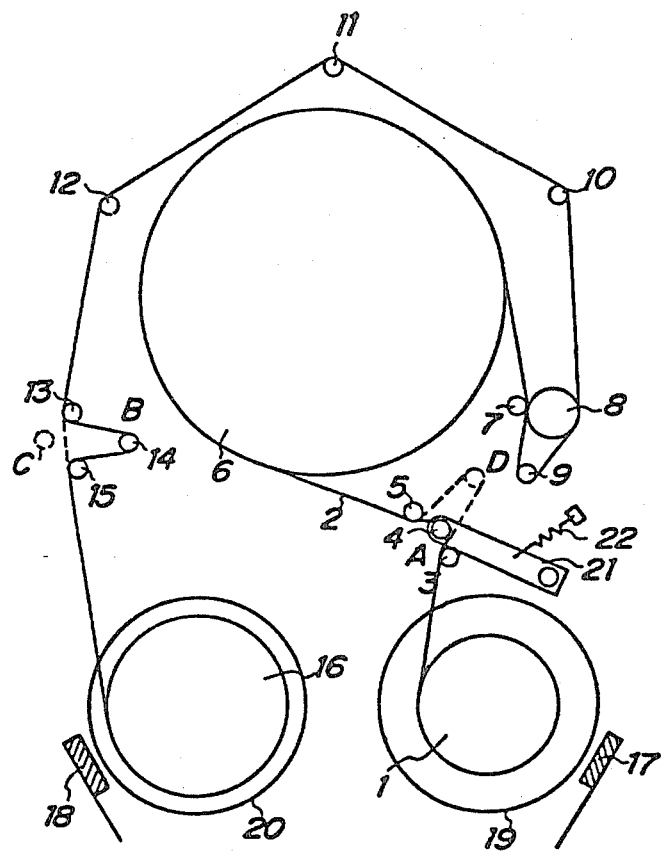
FIG. 1 shows a schematic plan view of a magnetic tape recording and/or reproducing apparatus of the prior art.
Figure 2:
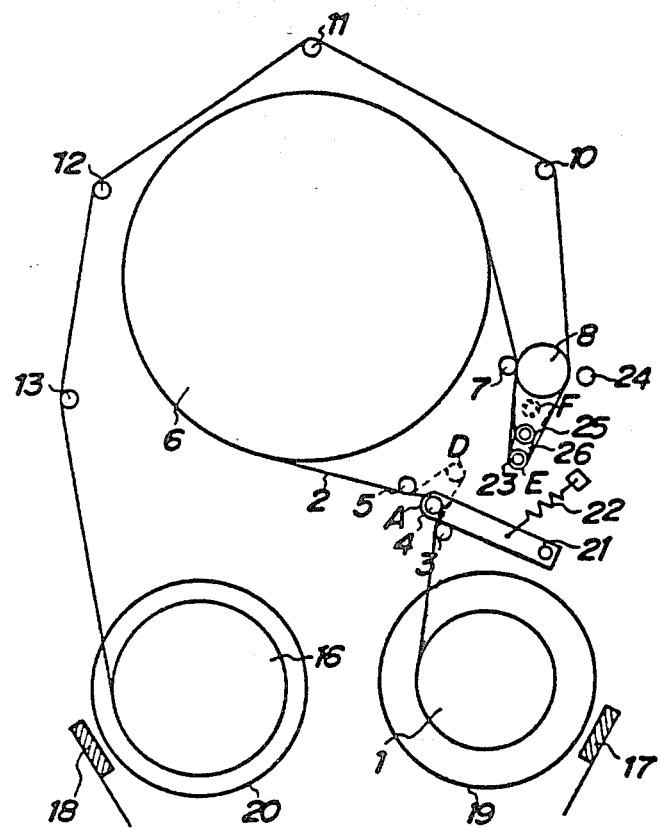
FIG. 2 shows a similar schematic plan view of an embodiment of a magnetic tape recording and/or reproducing apparatus according to the present invention.

In order to solve the problems of the prior art shown in FIG. 1 and to provide full return of a precise amount of the magnetic tape from the recording and reproducing head, the embodiment of the present invention shown in FIG. 2 disposes a fixed braking post on the opposite side of the pinch roller from the capstan as well as a movable tape guiding roller between the capstan and the fixed post. When the tape is stopped, the moveable guiding roller is moved to a position closer to the pinch roller so as to permit a given amount of reduction in the length of a loop of magnetic tape between the capstan and the fixed post. This reduction in the length of the tape loop permits feeding the tape thus released back toward the feed reel 1. As in the prior art discussed hereinbefore, a magnetic head assembly in a guide drum 6 is disposed along the tape path between a supply reel 1 and a take-up reel 16. A magnetic tape 2, supplied from the supply reel 1 is drawn at a constant speed past the guide drum 6 by a capstan 7 and a pinch roller 8. The tape 2 is guided to a moveable roller 23, past stationary posts 10, 11, 12 and 13, and accumulated by the take-up reel 16. A fixed braking post 24 is disposed on the opposite side of the pinch roller 8 from the capstan 8 and at a distance such that it does not contact the pinch roller 8 during recording or reproduction.

Figure 3:
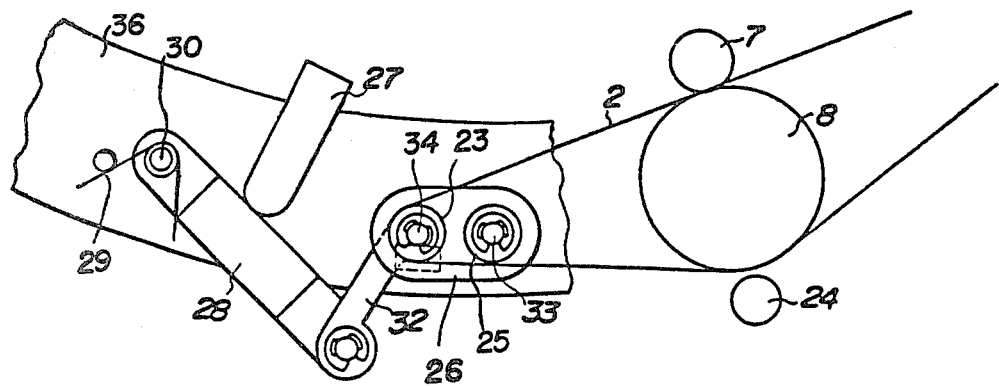
FIG. 3 is a detailed fragmentary plan view of part of the apparatus of FIG. 2 showing the loop forming means positioned to form a large loop.
Figure 4:
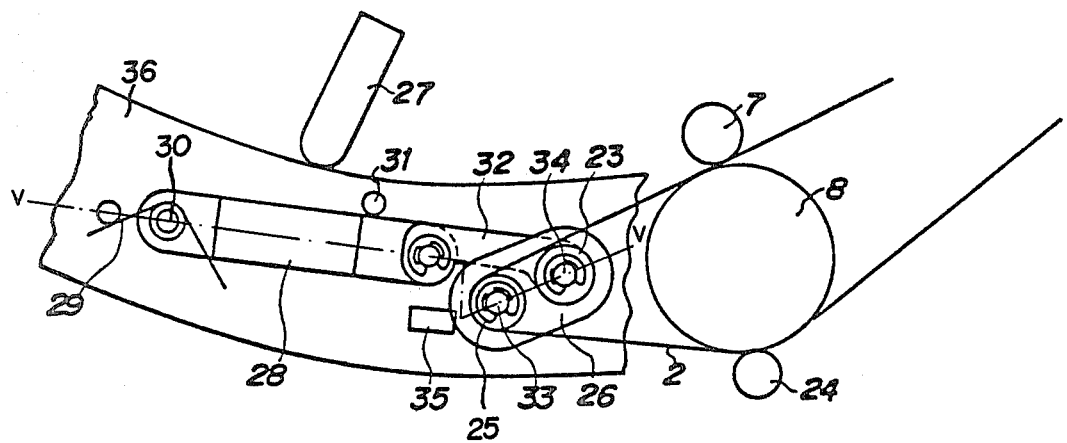
FIG. 4 is a view similar to that of FIG. 3, but showing the loop forming means positioned to form a small loop.
Figure 5:
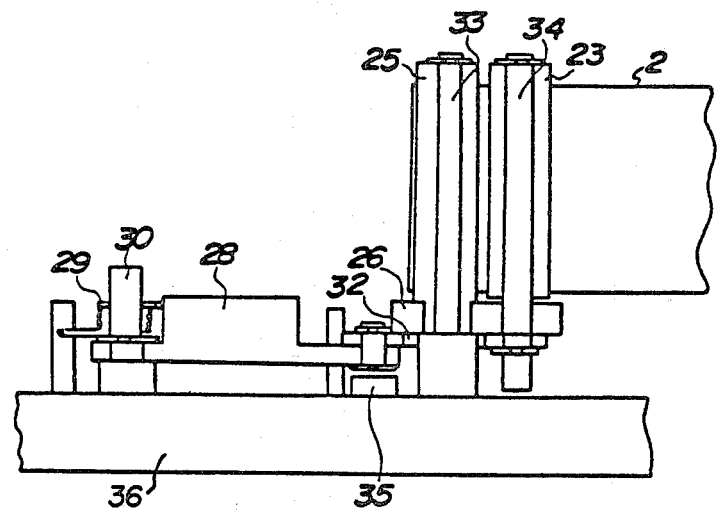
FIG. 5 shows a detailed fragmentary elevation view taken along the line V—V on FIG. 4.

The moveable roller 23 is positioned on a base 26, best seen in FIGS. 3, 4 and 5, which is pivotally mounted on a post 25. The moveable roller 23 is in position E when the pinch roller 8 is held against the capstan 7, and it moves the position F shown in dashed line when the pinch roller 8 is disengaged from the capstan 7. FIGS. 3 and 4 illustrate the manner in which the moveable roller 23 is moved about post 25.

By reference to these figures, when the pinch roller 8 is disengaged from the capstan 7, the pinch roller 8 is moved against the fixed braking post 24, thereby immediately stopping the magnetic tape 2. At the same time, the brakes 17 and 18 are applied to the supply reel 1 and take-up reel 16, respectively, and a depressing bar 27, moveable in synchronization with the pinch roller 8, moves away from a lever 28 that is pivotally supported by a pin 30. A spring 29 urges the lever 28 to rotate around the pin 30 counterclockwise until it contacts a stop 31. The base 26 is so constructed that it is linked the lever 28 by a link 32 one end of which pivotally supports the base 26 and the other end of which is pivotally mounted with respect to the lever 28. The base 26 turns clockwise around a shaft 33 which also supports stationary post 25. When the moveable roller 23 is rotated on base 26 into the position shown in FIG. 4, magnetic tape 2 is disengaged from the moveable roller 23 which previously guided the tape 2 and causes the tape to contact the post 25. The rotation of the base 26, synchronized to occur just after the pinch roller 8 moves out of contact with the capstan 7 and into contact with the fixed braking post 24, reduces the length of the magnetic tape path between the capstan 7 and the fixed post 24 in the stopped condition. Since the magnetic tape 2 is held stopped between the pinch roller 8 and the fixed braking post 24 during the inward motion of moveable roller 23 from positions E to F, a give amount of the magnetic tape 2 is returned past the disengaged capstan 7 and counterclockwise about the guide drum toward the supply reel 1. The released magnetic tape 2 is taken up by the loop shown in dashed line on moving post 4 which moves to position D under the urging of the spring 22. Conversely, after the pinch roller 8 is shifted toward the capstan 7, the depressing bar 27 depresses the lever 28 to turn it clockwise until the shaft 34 of the roller 23 fixed to the base 26 contacts a stop 35. This again lengthens the loop in preparation for the next stopping operation.

The inventors have confirmed that the embodiment of this invention described herein improves the accuracy in the amount of the tape to be returned upon stopping from about ±1 mm which is conventionally achieved in the prior art to an improved value of about ±0.3 mm which is achieved by the present invention.

In the arrangement described above, while the tape 2 is being fed past the capstan 7 at a constant speed, the tape tension at the post 4 in position A is balanced by the force of the spring 22. Less tape extension is needed during the returning of a given amount of the tape immediately after stopping. When used with a rotary magnetic head, a tape tension higher than about 80 gram cannot usually be used because excessive tension causes plugging of the head. Therefore, the use of a movable roller 23, which is positively moved in the direction in which a given amount of the magnetic tape is to be returned, reduces the adverse effect of the decreased tension in the stopped tape without requiring an excessively high tension during running. The inventors have also confirmed that the present invention desirably provides a constant angle of embrace of the magnetic tape about the roller 23, while the tape is being fed at a constant speed by means of the capstan 7 and the pinch roller 8. The constant angle of embrace also reduces change in the amount of the tape returned by maintaining the tape under constant tension even under changing environmental conditions. Further, in order to improve the accuracy in the amount of the tape to be returned, the timing of the pinch roller 8 and the movements of the roller 23 are synchronized such that the rotational movement of the roller 23 starts after the pinch roller 8 has finished its movement and has contacted the capstan 7 or the fixed braking post 24.

The stationary posts 10, 11, 12 and 13, the pinch roller 8, the moveable roller 23 fixed braking post 24, the stationary post 25, the base 26, the lever 28, the spring 29, the pin 30, the stop 31, the link 32 and etc. may optionally be mounted on a ring 36. The rotatable ring 36 can be rotated to load or unload the tape 2 around or from the guide drum 6. The operation of ring 36 is not shown in the drawings, but is described for example, in U.S. Pat. No. 3,968,517, issued July 6, 1976 to Chimura et al.

According to this invention, therefore, the accuracy in the amount of the magnetic tape returned upon stopping a magnetic tape recording and/or reproducing apparatus becomes less subject to environment-dependent changes in the friction co-efficient and to changes in reel inertia caused by varied diameter of the tape wound thereon. As a result, a helical scanning type VTR that incorporates this invention is capable of starting, editing and recording from the point where the magnetic tape has been temporarily stopped without erasing the previously recorded portion.

The embodiments of the invention in which an exclusive property or privilege is claimed, are defined as follows:

1. An apparatus for recording and/or reproducing information signals on magnetic tape comprising magnetic tape supply and take-up reel means, a magnetic head assembly disposed along a magnetic tape path between said supply and take-up reel means, a capstan and pinch roller for driving the magnetic tape therebetween at a constant speed, said pinch roller having a first position against the capstan and a second position away from the capstan, tape amount increasing means for providing a predetermined increase in the length of tape extending from said capstan toward said supply reel means, said tape amount increasing means comprising a braking member for pinching said tape between said braking member and said pinch roller when said pinch roller is in said second position, thereby preventing the movement of said tape therebetween, and a loop-forming member for forming a tape loop in the tape extending beyond said pinch roller, said loop-forming member having activating means therefor for defining a large loop when said pinch roller is in said first position thereof and a small loop when said pinch roller is in said second position.

2. The apparatus according to claim 1; wherein said activating means for defining a large loop includes means for moving said loop-forming member from a first position to a second position.

3. The apparatus according to claim 2; wherein said braking member is located adjacent the path of movement of the pinch roller at the side of the pinch roller remote from the capstan.

4. The apparatus according to claim 1 wherein said apparatus further comprises tensioning and returning means at a location closer to the supply reel means than to the magnetic head assembly.

5. The apparatus according to claim 1; further comprising braking meand adapted to stop the tape supply and take-up reel means when said pinch roller is in its second position.

6. The apparatus according to claim 4 wherein said tensioning and returning means comprises a lever pivotally secured to the apparatus of one end thereof; a tape guide member integral with the lever at a location remote from the one end thereof; and spring means attached to the lever and apparatus so as to maintain the tape under tension and to return the predetermined length of the tape when said pinch roller moves to said second position.

7. The apparatus according to claim 2 wherein said loop-forming member comprises a first guide member, a stationary second guide member and a base on which said first tape guide member is rotatably mounted, said base being pivotally mounted on said second tape guide member so as to shift said first tape guide member from said first position to said second position of said loop-forming member.

8. The apparatus according to claim 1; wherein said activating means is synchronized to cause said loop-forming member to define said large loop after said pinch roller is in abutment with said capstan and to define said small loop after said pinch roller is in abutment with said braking member.

9. Apparatus for returning a predetermined amount of magnetic tape toward a supply reel upon stopping a magnetic tape apparatus comprising: a guide drum, a pinch roller having first and second position, a capstan abutting said pinch roller in said first position of the latter so as to be operative to drive said magnetic tape therebetween past said guide drum, a fixed braking post abutting said pinch roller in said second position of the latter and being operative to brake said magnetic tape, said pinch roller being spaced from said fixed braking post in its first position and from said capstan in its second position, loop forming means spaced from said pinch roller, said loop forming means having a first condition forming a first length loop of magnetic tape from said pinch roller and a second condition forming a second length loop of magnetic tape from said pinch roller, said loop forming means being synchronized to be in said first condition when said pinch roller is in its first position and in its second condition when said pinch roller is in its second position, and said second length loop being shorter than said first length loop.

10. The apparatus according to claim 9, wherein said loop forming means includes a stationary post within said tape loop, a moveable roller within said tape loop, means for rotating the axis of said moveable roller about said stationary post from an active position further from said pinch roller to an inactive position nearer said pinch roller, and said active position corresponding to said first condition and said inactive position corresponding to said second condition.

11. The apparatus according to claim 9, further comprising second loop forming means between said guide drum and said supply reel for forming another loop of magnetic tape changeable by a length corresponding to the difference between said first and second length loops.

12. A magnetic tape recording and reproducing apparatus comprising a supply reel for magnetic tape, a take-up reel for said magnetic tape, a guide drum for passage thereabout of the magnetic tape, a pinch roller, means for guiding the magnetic tape in a path extending adjacent first and second sides of said pinch roller, a capstan adjacent said first side, a fixed braking post adjacent said second side, said pinch roller having a first position in abutment with said capstan and a second position in abutment with said fixed braking post, loop-forming means spaced from said pinch roller for forming a loop in the tape, which loop begins and ends at said first and second sides, respectively, of the pinch roller, said loop-forming means having means for increasing the length of the tape loop when said pinch roller is in said first position and for decreasing the length of said tape loop when said pinch roller is in said second position, and means for withdrawing the magnetic tape which is released by the shortening of said loop past said guide drum toward said supply reel.

13. The apparatus according to claim 12, wherein said loop-forming means includes a stationary post within said loop, a moveable roller within said loop, a rotatable base connecting said moveable roller to said stationary post, and means for moving said moveable roller from a position further from said pinch roller to a position closer to said pinch roller whereby the length of said loop is decreased.

* * * * *